Dec. 8, 1970   T. E. McILRAITH ET AL   3,545,265
HORSEPOWER MEASURING APPARATUS
Filed Jan. 27, 1969
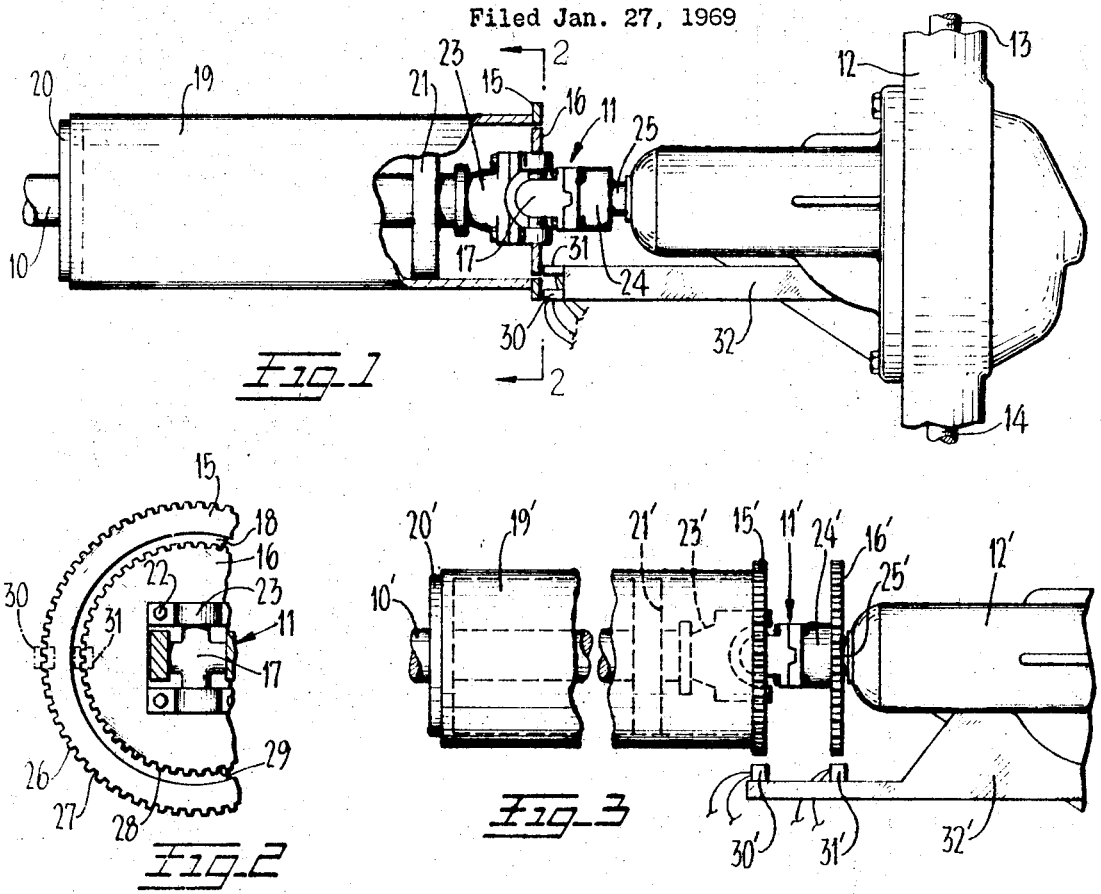
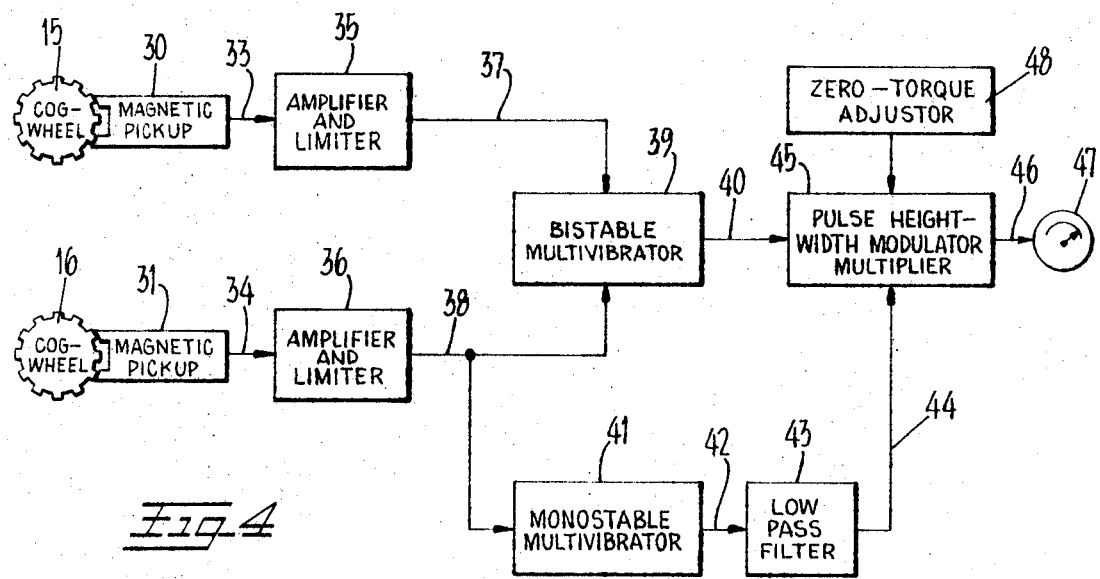
INVENTORS.
TERRY E. McILRAITH
CHARLES A. KINGSFORD-SMITH
BY
Gardner & Zimmerman
ATTORNEYS

United States Patent Office 3,545,265
Patented Dec. 8, 1970

3,545,265
HORSEPOWER MEASURING APPARATUS
Terry E. McIlraith, 5880 Chabot Court, Oakland, Calif. 94618, and Charles A. Kingsford-Smith, Rte. 2, Box 325D1, Loveland, Colo. 80537
Filed Jan. 27, 1969, Ser. No. 794,240
Int. Cl. G01l 3/10
U.S. Cl. 73—136                                   13 Claims

ABSTRACT OF THE DISCLOSURE

Apparatus is described for measuring the horsepower produced by an automobile drive shaft or the like. The apparatus includes a pair of magnetic exciter plates located in close axial proximity to a universal joint in the shaft but secured to the shaft at widely spaced axial locations. A pair of magnetic sensors respectively associated with the exciter plates sense the angular positions thereof and produce separate reference signals, whose change in phase difference is proportional to the change in shaft torque. The reference signals are compared in a phase detector which produces an output torque signal proportional to the torque developed along the shaft, and one of the reference signals is analyzed in a pulse counter which produces in accordance with the frequency of such signal an output velocity signal proportional to the angular velocity of the drive shaft. The torque signal and velocity signal are combined in a multiplier to provide a product signal proportional to the horsepower produced by the shaft.

---

This invention relates to apparatus for measuring the torque or horsepower produced by a rotatable shaft and, more particularly, to apparatus for determining the torque or horsepower produced by a shaft having a universal joint therealong, such as the drive shaft of an automotive vehicle or the like.

As is well understood, power may be defined as the time rate at which work is done, and a common unit of measure thereof is the horsepower which equals a work rate of 550 foot-pounds per second or 33,000 foot-pounds per minute. The work transmitting by a rotating shaft can be measured in terms of the torque it develops, and the time in which the work is done can be measured in terms of the angular velocity of the shaft. Thus, for example, the horsepower transmitted by a rotatable shaft is equal to the torque therealong in foot-pounds multiplied by the velocity of the shaft in revolutions per minute and further multiplied by a constant K (namely 2 pi radians/33,000) to provide the requisite unit dimensions. Thus in mathematical notation $$HP = 2\pi TN/33,000$$

where HP is the horsepower, T is the torque in foot-pounds, and N is the angular velocity in revolutions per minute.

In the past, difficulty has been experienced in accurately determining during normal use the contemporary value of the horsepower or torque produced by an automotive drive shaft or other shaft having a universal joint therealong. The joint permits angular movement or, in other words, relative transverse articulations of certain sections of the shaft or drive-train components associated therewith relative to others, and this movement introduces errors into the horsepower or torque readings. Therefore, an object, among others, of the present invention is to provide an improved apparatus for measuring the power or torque produced by an automotive drive shaft or other torque-producing shaft having a universal joint therealong affording relative transverse articulations between various sections of the shaft or elements attached thereto.

Another object of the invention is to provide an improved power-measuring apparatus which determines both the torque produced along a shaft and the angular velocity thereof and combines such quantities to form a product resultant proportional to the horsepower produced by the shaft. Still another object of the invention is that of providing apparatus with which the torque produced along a shaft can be determined by measuring the relative angular displacement enforced on a pair of reference devices by torque-induced torsional displacement of the shaft, and which reference devices are secured to the shaft at axially spaced locations therealong but are each positioned in close proximity to a universal joint along the shaft so as to minimize the error-producing effects of relative transverse displacements or articulations of shaft sections or components respectively connected to opposite elements of the universal joint.

Still another object is to provide in apparatus as described a pair of reference devices, at least one of which is located in a plane through the center of such universal joint substantially normal to the axis of the drive shaft, and which reference devices are respectively associated with magnetic sensors excited by rotation of the reference devices and operative to produce reference signals whose phase relationship is a measure of the torque developed along the drive shaft and the frequency of which is proportional to the angular velocity of such shaft. A further object is to provide an arrangement as described in which the reference devices are cylindrical plates—one of which is a ring-shaped annulus coaxially receiving the other reference device within the opening thereof, and each of which devices lies in a plane through the center of the universal joint substantially normal to the longitudinal axis of the shaft. Additional objects and advantages of the invention, especially as concerns particular features and characteristics thereof, will become apparent as the specification proceeds.

Embodiments of the invention are illustrated in the accompanying drawing, in which:

FIG. 1 is a broken top plan view of an automobile drive shaft and differential housing having the invention associated therewith, certain components of the assemblage being broken away and shown in section to illustrate structural features;

FIG. 2 is a broken transverse sectional view taken along a plane indicated by the line 2—2 of FIG. 1;

FIG. 3 is a broken side view in elevation similar to that of FIG. 1, but illustrating a modified form of the invention; and FIG. 4 is a block diagram of the circuitry forming a part of the apparatus.

The invention is shown in the drawing in the environment of an automotive vehicle which may be a passenger car having an elongated, axially extending and rotatable drive shaft 10 equipped with a universal joint 11. Joint 11 connects a first portion of the shaft with a second portion thereof leading to differential gearing located within a housing 12. By means of such differential gearing, the rear wheels (not shown) of the vehicle are driven through axles 13 and 14. As respects the present invention, the shaft 10, universal joint 11, housing 12 and gearing located therewithin, and axles 13 and 14 may be completely conventional and, therefore, the structural and functional details thereof are well known and will not be described.

Mounted along the shaft 10 are a pair of reference devices 15 and 16 located in close proximity to the universal joint 11 and, in the embodiment of the invention illustrated in FIGS. 1 and 2, disposed in substantial alignment with the center connector or pivot joints (generally denoted 17) of the universal joint 11. More especially as concerns the embodiment shown in FIGS. 1 and 2, the reference devices 15 and 16 are disposed in coaxially circumjacent relation with respect to each other and to the axis of the shaft 10; and in this reference, the device is an annulus or ring having a large central opening 18 receiving the device 16 therein (as shown best in FIG. 2).

Although located in close physical proximity, the reference devices 15 and 16 are secured to the shaft 10 at widely spaced axial locations therealong. More particularly, the reference device 15 is welded or otherwise fixedly attached to one end of an elongated hollow tube 19 which is coaxially circumjacent the shaft 10. Such tube is secured to the shaft by means of an end wall or transversely disposed connector 20 fixedly secured to the shaft 10 and to the tube 19 at its forward end. Accordingly, the reference device 15 is constrained upon the shaft 10 so as to rotate therewith, and the point of securance of the device 15 to the shaft is at the axial location therealong of the transverse wall 20. For the purpose of stabilizing the tube 19, it may be rotatably supported intermediate the ends thereof by a bearing 21 which does not inhibit substantially free angular displacements of the shaft 10 relative to the tube 19.

Reference device 16 is secured to shaft 10 through the universal joint 11. That is, it is fixedly secured by a plurality of cap screws 22 to the forward yoke or portion 23 of the universal joint, which forward portion is rigid with or essentially non-movable relative to that portion or section of the shaft 10 extending forwardly from the universal joint. As is well known, the universal joint 11 has a rear yoke or portion 24 rigid with or essentially non-movable relative to that section or portion of the shaft extending rearwardly from the universal joint, which rearwardly-extending section is the input shaft to the differential gearing within the housing 12 and for specific identification, is denoted with the numeral 25. The two yokes 23 and 24 are pivotally interrelated for relative angular displacements about axes disposed at right angles with respect to each other by the center connector 17, as is most evident in FIG. 2.

The reference devices 15 and 16 are formed of a magnetic material such as steel, and the device 15 is provided along the cylindrical surface thereof with a plurality of equally spaced cogs or teeth 26 defining lands separated from each other by recesses 27 interposed therebetween. Similarly, the reference device 16 is provided along the cylindrical surface thereof with a plurality of equally spaced cogs or teeth 28 defining lands separated from each other by recesses 29 interposed therebetween. A pair of sensors 30 and 31 are respectively associated with the reference devices 25 and 16. Such sensors are constrained against rotation and are fixedly mounted relative to articulations of the shaft by means of a bracket 32 welded or otherwise mounted upon the differential housing 12. The sensors 30 and 31 are disposed in close proximity to the reference devices 15 and 16 and, more especially, to the outer cylindrical surfaces thereof so as to face the cogs or lands 26 and 28.

Sensors 30 and 31 are magnetic pick-ups influenced or excited by movement of the magnetic cogs or lands 26 and 28 therepast. The sensors 30 and 31 may be conventional magnetic pick-ups, and by way of example, each may be a generally U-shaped permanent magnet having an electric oil wound about the base or connector leg of the magnet which forms a core for the coil, whereupon angular displacement of the teeth or cogs past the poles of the magnet upon rotation of the associated reference device causes an AC voltage to be generated in the coil having a frequency proportional to the angular velocity of the reference device and, therefore, proportional to the velocity of the shaft 10.

Rotation of the shaft 10 results in twisting or torsional displacement along the length thereof that is incrementally uniform and, therefore, the extent of the torsional displacement for any given torque increases with shaft length. Also, as is well known the magnitude of the torsional displacement is directly proportional to the torque developed along the shaft. Since the extent of the torsional displacement along a shaft for any particular torque value increases with shaft length, it may be stated that the accuracy of any torque measurement is generally improved by increasing the spacing along the shaft between the two points at which torsional displacements are measured because the greater the relative displacements, the less criticality or refinement is required in the measuring instrumentation.

In the embodiment of the invention illustrated in FIG. 1, the spacing for torque measuring purposes between the reference devices 15 and 16 is substantially equal to the axial length of the tube 19 since the reference device 15 is connected to the shaft 10 at one end of the tube 19, and the reference device 16 is connected to the shaft 10 at the other end of the tube. However, the two devices are disposed physically in very close proximity which is a significant advantage in locating and supporting the sensors 30 and 31. Thus, as respects the reference devices 15 and 16, for any given torque value along the shaft 10 they are displaced angularly relative to each other through a readily measurable amount, and the extent of any such angular displacement is directly proportional to the magnitude or value of the torque developed along the shaft.

In an automotive vehicle and in other environments in which relative transverse movements or articulations (in either or both horizontal or vertical directions) between components of a drive train must be accommodated and a universal joint is included for this purpose along a drive shaft, reliability and accuracy of torque measurements involving such shaft are significantly improved by minimizing insofar as is practicable error otherwise introduced by such movements or articulations; and in the present invention such error is minimized by positioning the reference devices and sensors used therewith in close proximity to the universal joint, for it will be evident that such articulations are smallest thereat and are progressively amplified as the parts connected to the universal joint become more remote therefrom. Thus, in FIG. 1 the sensors 30 and 31, which are fixed against rotation and therefore must be mounted on components other than the rotatable shaft 10 (in this case the differential housing 12), are disposed at about the center portion 17 of the universal joint and the reference devices 15 and 16 are located in substantial alignment therewith. Accordingly, relative transverse displacements of the differential housing 12, whether vertical or horizontal, relative to the shaft 10 are smallest at such center portion 17 and, therefore, have least error-producing influence on the measuring apparatus.

Since the torque developed along the shaft 10 must be transmitted through the universal joint 11 to the input shaft 25 of the differential, there is likelihood of angular displacements along the axis of the shaft between the front and rear components 23 and 24 of the universal joint 11 (especially as the pivotal connections therebetween wear) which might introduce a degree of inaccuracy in the torque measurements unless compensation therefor is included in the apparatus. Such angular displacement or "play" in the joint would be especially disadvantageous if the torque of the shaft is to be measured for both directions of rotation of the shaft. In the embodiment illustrated in FIGS. 1 and 2, any such angular displacements between the joint components 23 and 24 are completely negated as a factor influencing accuracy of the measurements because connection of the reference devices 15 and 16 to the shaft 10 is made on the same side of the universal joint—i.e., the reference device 15 is connected directly to the shaft 10 through the tube 19 (which is rigidly affixed to the shaft), and the reference device 16 is connected to the shaft 10 through the joint component 23 (which is rigidly attached to the shaft 10).

In the embodiment of the invention illustrated in FIG. 3, the reference devices are located on opposite sides of the universal joint. With the exception of this change however, and a respectively corresponding change in the positioning of the sensors, the apparatus is essentially the same as the earlier described embodiment and, therefore, the various parts thereof are denoted with the primed form of the same numerals used in FIG. 1 to identify the respectively corresponding parts. Thus, the reference device 16′ has been moved rearwardly along the drive shaft and is bolted or otherwise fixedly secured to the rear component 24′ of the universal joint 11′. The sensors 30′ and 31′ are spaced apart axially along the bracket 32′ so as to align respectively with the reference devices 15′ and 16′.

The apparatus functions in precisely the same manner explained heretofore with angular displacements between the reference devices 15′ and 16′ being caused by torsional displacement along the shaft 10′ and, therefore, being representative of the magnitude of the torque developed therealong. It will be appreciated that in initially calibrating the apparatus, care must be exercised in displacing or loading the components to take up any slack between the opposite sides 23′ and 24′ of the universal joint 11′ and therealong make certain that any angular displacements between the reference devices 15′ and 16′ will accurately reflect torque-induced displacements thereof rather than relative displacements owing to looseness in the universal joint. It will also be appreciated that if there is looseness in the joint, torsional displacement can be measured with accuracy for only one direction of torque transmission along the shaft since the play will cause a relative displacement of the wheels upon a reverse torque.

The circuitry illustrated in FIG. 4 includes the aforementioned reference devices or cog wheels 15 and 16 and the sensors 30 and 31 respectively associated therewith. The sensors are magnetic pick-ups as explained heretofore, and they are dimensioned so that the poles or ends thereof match the lands or cogs in the respectively associated reference devices with the result that the two poles of each pick-up are simultaneously opposite the lands of the associated reference device. As the drive shaft 10 rotates, AC voltages are induced in the pick-ups and appear along the lines 33 and 34 leading from the sensors. The frequency of such AC signal voltages on the lines 33 and 34 is proportional to the angular velocity of the shaft 10, and the phase displacement of such voltages is a direct measurement of the torque developed along the shaft 10 and which torque causes such phase difference or displacement of the signal voltages.

The voltage signals appearing on the lines 33 and 34, after first being amplified and shaped in amplifier-limiter modules 35 and 36, respectively appear as square wave pulses on signal lines 37 and 38 and are delivered thereby to a comparison means 39 operative to determine any differences between the two reference signals fed thereto reflecting the magnitude of any angular displacements enforced upon the reference devices 15 and 16 by the contemporary value of the torque developed along the shaft 10. The comparison means 39 in the circuit shown is a phase detector effective to determine any phase difference in the two reference signals fed thereto on the signal lines 37 and 38 and to produce an output torque signal on line 40 in the form of an electrical signal having some characteristic proportional to the phase difference between the input signals, e.g., a rectangular wave having a duty cycle so proportional, and therefore proportional to the torque developed along the shaft 10. In a still more particular sense, the phase detector 39 may be a bistable multivibrator.

It may be observed that the reference signal appearing on the line 38 is also fed to a pulse counter in the form of a monostable multivibrator 41. As indicated hereinbefore, the frequency of the square-wave signal pulses appearing on the line 38 is proportional to the angular velocity of the shaft 10; and, therefore, the counter 41 is operative to determine the angular velocity of the shaft from the frequency of the reference signal appearing on the line 38. The signal output from the counter 41 appearing on the signal line 42 is delivered to a low-pass filter 43 that provides on the output line 44 therefrom a DC voltage having a value proportional to the angular velocity of the shaft 10. Thus, such DC voltage on the line 44 constitutes an output velocity signal and is one of the inputs to a multiplier 45—the other input thereto being the torque signal delivered thereto on the signal line 40. The multiplier 44 may take various forms—a purely analog multiplier, for example, or a pulse-height-width modulator as indicated; and in any event, it combines the input signals delivered thereto to provide a product signal on the output line 46 therefrom representative of the horsepower produced by the shaft 10. The signal on the line 46 is a DC voltage proportional to the product of shaft torque and velocity, and it is delivered to a DC meter 47 calibrated to read directly in units of horsepower.

In the event that the reference devices 15 and 16 (or 15′ and 16′ are not perfectly aligned with respect to each other and with reference to the sensors 30 and 31 so that there is no phase difference between the reference signals appearing on the lines 37 and 38 under conditions in which no torque or zero torque is developed along the shaft 10, then the torque signal appearing on the line 40 will comprise two components—one of which represents the actual or measured value of the contemporary torque developed along the shaft 10, and the other of which is a zero torque error component caused by any such misalignment of the reference devices. For the purpose of providing a convenient arrangement for cancelling or compensating for the error component of the torque signal, means are included in the circuitry therefor; and since this error signal component is essentially a constant, correction therefor can be provided in a variety of manners such as by means of a zero-torque adjusted means 48 (as shown in FIG. 4) which provides suitable zero-torque error correction in the multiplier 45.

In use of the apparatus, the circuitry is first calibrated to compensate for any disparity in phase between the reference signals appearing on the lines 37 and 38 under the condition of zero-torque being developed along the shaft 10. In this respect, the horsepower transmitted by the shaft 10 constitutes the product of the torque developed thereby and the angular velocity thereof with such product being adjusted by a constant, all as explained heretofore. Thus, whatever the contemporary value of the horsepower, the apparatus functions to provide the value thereof for direct reading on the meter 47.

As the torque developed along the shaft 10 increases, the relative angular displacement of the reference devices 15 and 16 increases, and vice versa. It will be evident, then, that the reference device 15 may be considered to be the standard or base of comparison since it is secured to the shaft 10 at a location most remote from the point of load application thereto which, in the embodiments of the invention illustrated, is the axle loads 13 and 14 applied to the shaft through the differential gearing contained within the housing 12. Accordingly, the angular displacement of the reference device 16 is compared with such standard defined by the reference device 15, and the relative angular displacement therebetween provides the measure of the torque developed along the shaft.

It will be appreciated that instrumentation could be included in the apparatus to provide direct reading indicia of the torque developed along the shaft (i.e., utilizing the torque signal appearing on the line 40 to energize a meter), and to provide direct reading indicia of the velocity of the shaft 10 (i.e., utilizing the velocity signal appearing on the line 44 to energize a meter). As indicated hereinbefore, location of the reference devices in close proximity to the center of the universal joint 11 (and advantageously in substantial alignment with the center thereof) substantially minimizes error otherwise caused by frame and axle displacements or articulations relative to the drive shaft 10 as the vehicle traverses roadways. That is, in each embodiment of the invention, the reference device 15, or 15', is located in a plane that bisects the center of the universal joint 11 and center line of the shaft 10 to minimize such error caused by axle-frame motion as the vehicle is operated. In the embodiment of FIGS. 1 and 2, each of the reverse devices 15 and 16 is located in such bisecting plane. Also, supporting the sensors 30 and 31 on the housing 12 stabilizes the apparatus and minimizes relative transverse displacements between the various components thereof by utilizing the heavy drive shaft bearings.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In combination, an axially rotatable drive shaft having first and second shaft portions a universal joint connecting said first and second portions and, enabling transverse articulations of a first portion of said shaft relative to a second portion thereof; a pair of reference devices respectively secured to said shaft at axially spaced locations therealong so as to rotate therewith, at least one of said reference devices being secured to the first portion of said shaft; a pair of sensors respectively associated with said reference devices and being mounted in a fixed position, said sensors being operative to produce reference signals indicative of the respective axial angular displacements of said reference devices; comparison means connected with said sensors for receiving said reference signals from said sensors and operative to determine differences between such signals reflecting the magnitude of any relative angular displacement enforced on said reference devices by torque developed along said shaft, said comparison means producing a torque signal corresponding to any such relative angular displacement proportional to the value of such torque; and the one reference device secured to said first portion of said shaft lies in a plane which passes through the center of the universal joint and is substantially normal to the longitudinal axis of the shaft to minimize the effect of transverse articulations between said first and second shaft portions on the reference signal produced by the sensor associated with said one reference device.

2. The combination of claim 1 further including counter means connected with one of said sensors for receiving the reference signal therefrom and operative in response thereto to produce a velocity signal proportional to the axial angular velocity of said shaft; and multiplier means for combining said torque and velocity signals to produce a product signal representative of the power produced along said shaft.

3. The combinattion of claim 1 and further comprising an elongated hollow tube coaxially circumjacent said first portion of said shaft with one end thereof adjacent said universal joint and its other end secured to said shaft so as to rotate therewith, one of said reference devices being fixedly secured to said tube at the end thereof adjacent said universal joint for securance thereof through said tube to said shaft whereby the physical location of said reference device fixed to said tube is close to the said universal joint while the point of securance thereof so said first portion of said shaft is spaced from said joint.

4. The combination of claim 2 in which both of said reference devices are disposed adjacent said universal joint in substantially concentric orientation with respect to one another.

5. The combination of claim 1 in which each of said reference devices is in substantial alignment with the center of said universal joint.

6. The combination of claim 3 in which the aforesaid reference device secured to said hollow tube is substantially aligned with the center of said universal joint and the other reference device is spaced axially therefrom.

7. The combination of claim 2 in which each of said sensors produces an AC reference signal having a frequency proportional to the angular velocity of said shaft and in which phase displacements between said reference signals are a measure of the torque along said shaft, said comparison means being a phase detector operative to determine any such phase displacement between said reference signals.

8. The combination of claim 7 in which said phase detector comparison means comprises a bistable multivibrator, and in which said counter means comprises a monostable multivibrator.

9. The combination of claim 7 in which each of said sensors is a magnetic pick-up, and in which each of said reference devices is a magnetic exciter.

10. The combination of claim 2 further comprising an elongated hollow tube coaxially circumjacent said shaft and terminating at one end adjacent said universal joint and at its other end being secured to said shaft so as to rotate therewith, one of said reference devices being fixedly secured to said tube at the end portion thereof adjacent said universal joint and being secured therethrough to said shaft, whereby the physical locations of said reference devices are close to each other while the points of securance thereof to said shaft are at relatively widely spaced axial locations, and in which each of said sensors produces an AC reference signal having a freqeuncy proportional to the angular velocity of said shaft and in which phase displacement between said reference signals are a measure of the torque along said shaft, said comparison means being a phase detector operative to determine any such phase displacements between said reference signals.

11. The combination of claim 10 in which the aforesaid reference device secured to said hollow tube is substantially aligned with the center of said universal joint, and in which each of said sensors is a magnetic pick-up and each of said reference devices is a magnetic exciter.

12. The combination of claim 10 in which said reference devices are disposed with respect to each other in substantially concentric orientation, so that both of said reference devices are in substantial alignment with the center of said universal joint.

13. The combination of claim 10 in which said phase detector comparison means comprises a bistable multivibrator, in which said counter means comprises a monostable multivibrator, and in which said multiplier means includes a pulse-height-width modulator.

References Cited

UNITED STATES PATENTS

| | | | |
|---|---|---|---|
| 2,877,416 | 3/1959 | Grisdale | 324—83 |
| 3,222,550 | 12/1965 | Willard et al. | 307—88.5 |
| 3,295,367 | 1/1967 | Rundell | 73—136 |
| 3,348,143 | 10/1967 | Young | 324—70 |
| 3,428,794 | 2/1969 | Norsworthy | 235—181 |

RICHARD C. QUEISSER, Primary Examiner

J. WHALEN, Assistant Examiner

U.S. Cl. X.R.

235—194; 324——83